United States Patent

Dryden

[11] 4,250,038
[45] Feb. 10, 1981

[54] SCREEN DEVICE AND METHOD

[75] Inventor: Joseph L. Dryden, Galesburg, Ill.

[73] Assignee: Bixby-Zimmer Engineering Co., Galesburg, Ill.

[21] Appl. No.: 927,136

[22] Filed: Jul. 21, 1978

[51] Int. Cl.³ .................. B01D 21/02; B01D 25/04
[52] U.S. Cl. ................... 210/409; 209/264; 209/274; 209/281; 209/393; 210/420; 210/433.1
[58] Field of Search .............. 209/273, 274, 281, 352, 209/393, 395; 210/409, 264, 274, 456, 483, 495, 499, 513, 433 R, 420, 455, 247

[56] References Cited

U.S. PATENT DOCUMENTS

| 828,715 | 8/1906 | Cook | 210/409 |
|---|---|---|---|
| 960,111 | 5/1910 | Robinson | 210/409 |
| 2,679,318 | 5/1954 | Soldan | 209/393 |
| 3,169,111 | 2/1965 | Rose et al. | 210/247 |
| 3,777,893 | 12/1973 | Ginaven | 210/499 |
| 4,113,626 | 9/1978 | Detcher | 209/393 |

Primary Examiner—Frank Sever
Attorney, Agent, or Firm—Dybvig & Dybvig

[57] ABSTRACT

A sieve or screen of the type supported in an inclined position so that a slurry can cascade downwardly over a working surface of the screen is formed with spaced apart, generally parallel rods or wires which extend transversely to the direction of slurry flow; and is characterized in that the means or hardware which secure the rods in spaced apart and parallel relationship are located at the working surface of the screen, as opposed to the traditional practice of locating such hardware at the opposite or underlying surface of the screen.

13 Claims, 6 Drawing Figures

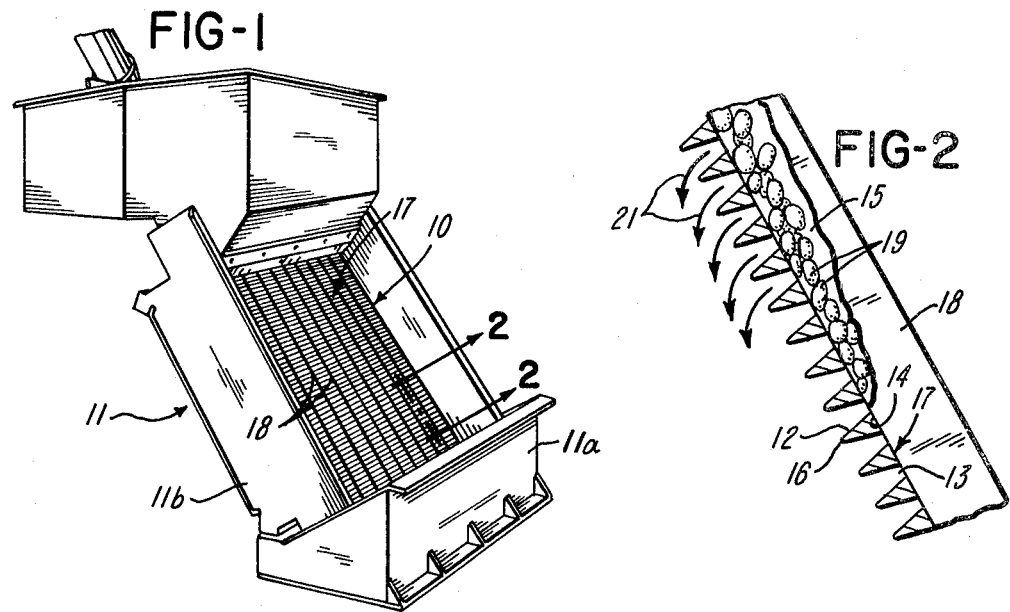
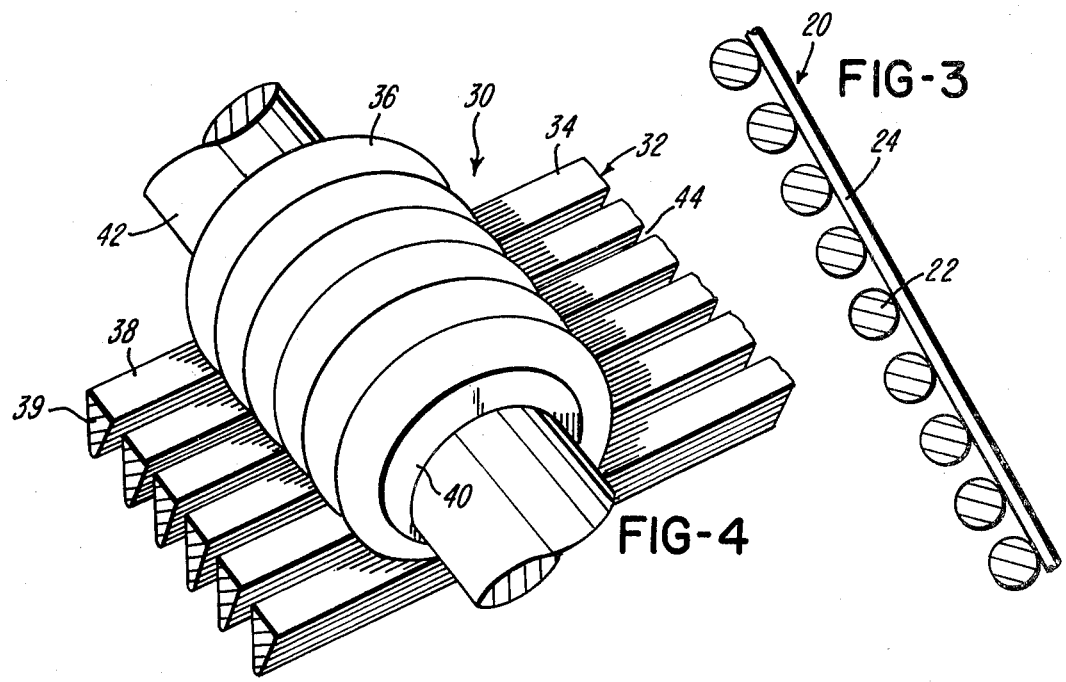
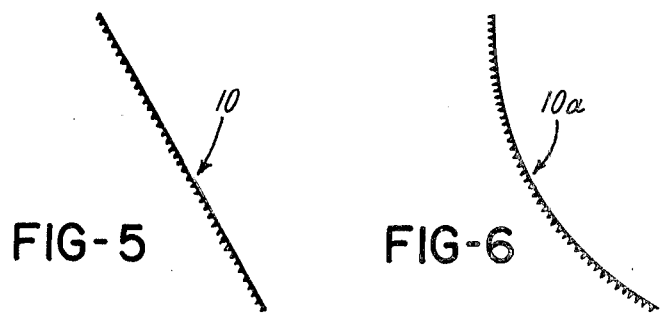

SCREEN DEVICE AND METHOD

BACKGROUND OF THE INVENTION

1. Field of the Invention

This invention relates to sieves or screens and similar structures of the type utilized in the separation of liquids from solids and, more particularly, to screens fabricated with means disposed at the working surface thereof for supporting the rods or wires thereof in spaced apart and generally parallel relationship.

2. The Prior Art

It has recently become a common practice to separate water and undersized solids from oversized solids present in a slurry by passing the slurry over a cross-flow screen formed with rods or wires extending generally parallel to one another, but generally perpendicular to the direction in which the slurry flows. It has, furthermore, become a common practice to employ such screens as so-called static sieves, i.e., sieves or screens which are supported in an inclined position and which generally remain stationary as a slurry is permitted to flow downwardly over the screen. A difficulty encountered with static sieves of the type under discussion is that as oversized solids separated from the slurry move downwardly over the upper surface of the screen, and the undersized portion of the slurry passes through the screen, water sought to be drained from the under surface of the screen tends to cling, by reason of surface tension and related phenomena, to the underside of the screen where such clinging water is readily reabsorbed upwardly into the solid components traveling over the working surface of the screen. This surface tension problem is aggravated by the presence of supporting hardware associated with the underneath surface of the screen. Such hardware may be in the form of loops formed in the rods or wires, which allow the rods to be assembled to transverse supporting members or cross-rods. Alternately, the hardware may simply comprise weldments formed at the underneath surface of the screen for supporting the screen rods in spaced apart and parallel relationship. Since the liquid or water seeking to pass through the screen must also pass alongside the underlying hardware, the liquid frequently encounters small angularities or gaps between parts which encourage surface tension and capillary phenomena, the effect of which is to accumulate liquids at the underneath surface of the screen. The indicated problem has been recognized in the prior art. U.S. Pat. No. 3,169,111, issued to C. G. Rose et al., teaches the formation of barrier means at the underside of the screen for disrupting films of liquid tending to form at the underside of the screen. U.S. Pat. No. 3,777,893, issued to M. F. Ginaven, teaches the use of curved or bellied wire formations which encourage the liquid passing through a screen to migrate away from underlying supports such as would promote the retention of liquid at the underside of the screen due to surface tension effects.

SUMMARY OF THE INVENTION

The problems above described which involve surface tension phenomena, exacerbated by the presence of hardware or the like located in the underlying surface of an inclined cross-flow screen, are minimized in the present invention by the simple expedient of eliminating the hardware from the underlying surface. More particularly, in the present invention, the hardware which supports the screen rods in spaced apart and generally parallel relationship has been transferred to the working surface of the screen. The presence of hardware at the working surface of a screen has in the past been considered disadvantageous because of the effect such hardware has on the orderly progression of material over the screen. Thus, one would not ordinarily place hardware at locations where it would interfere with the regular movement of the material sought to be treated in passage over the screen. It has been found, however, that in certain screen operations, particularly static sieve operations, the slurry or other material to be processed in passing downwardly over the screen follows regular, somewhat streamlined, courses; and hardware which is located at the working surface of the screen in positions which are generally parallel to what would be streamlines does not interfere with the operating efficiency of the screen. More to the point, it is found that properly designed surface hardware can promote the travel of a slurry or other material along streamlines so as to resist any tendency of the material to wander laterally to one side or the other of the screen so as to overload that side of the screen to which the material is wandering. Thus, while underlying hardware would appear preferable for many screen operations, it has been discovered that overlying hardware can be beneficial and indeed superior in static sieve applications.

It is, accordingly, an object of the present invention to provide a screen in which the hardware which supports the screen rods in spaced apart and parallel relationship is disposed at the working surface of the screen in lieu of the opposite surface of the screen.

Another object of this invention is to provide a new and improved static sieve.

Still another object of the present invention is to provide a new and improved method for preserving a separation between liquid and solids components of a slurry.

BRIEF DESCRIPTION OF THE DRAWINGS

FIG. 1 is a perspective view illustrating a screen in accordance with the present invention mounted on a support structure for operation as a static sieve.

FIG. 2 is an enlarged section view taken substantially along the line 2—2 of FIG. 1 and to which has been added a schematic illustration of a slurry cascading downwardly over the working surface of the screen.

FIG. 3 is a section view analogous to that of FIG. 2 illustrating a modification.

FIG. 4 is a fragmentary perspective view illustrating a second modification.

FIGS. 5 and 6 are elevation views schematically illustrating typical static sieve configurations.

DETAILED DESCRIPTION OF THE PREFERRED EMBODIMENTS

FIG. 1 illustrates a conventional type of static sieve mounting in which a screen 10 is fitted into an inclined opening located in a supporting structure 11. The supporting structure 11 supports the screen 10 in an inclined or downhill position, and, as is known in the art, feeds slurry which is to be processed downwardly over the screen 10 whereby the oversized component of the slurry passing over the screen is delivered to a first receiver 11a disposed below the screen and the undersized component passes through the screen to a receiver 11b disposed behind the screen. The screen 10 comprises parallel rod elements 12, appearing in section in FIG. 2, which extend horizontally across the opening of the supporting structure 11.

As apparent in FIG. 2, the rod elements 12 are of a generally triangular cross section, the bases 14 of such elements being disposed in coplanar relationship and defining the working surface 17 of the screen which appears over a larger area in FIG. 1. Opposite the bases of the triangular rod elements 12 the rods terminate with apices 16 which, in reference to FIG. 1, project inwardly of the supporting structure 11 toward the receiver 11b. The bases of the rod elements 12 are spaced apart to define slots 13 which extend horizontally across the screen 10.

At horizontally spaced intervals the plural rod elements 12 have their bases 14 welded or otherwise secured to vertically extending and generally rectangular bars 18. The assembly of rods 12 and bars 18 provides a relatively rigid screen structure.

As is apparent in FIG. 1, the bars 18 occupy only a small proportion of the working surface area of the screen 10. Assuming a slurry to have been discharged downwardly upon the working surface 17 of the screen, i.e., that surface formed by the coplanar bases 14, it will be apparent that the slurry skips, so to speak, from base 14 to base 14 in proceeding downwardly of the screen 10. As known to those skilled in the art, this skipping advance of the slurry downwardly along the bases 14 will cause water or other liquid as well as undersized solids entrained in such liquid and tending to settle downwardly from the slurry to be shaved from the slurry by the uppermost edges of the bases 14, whereupon the water or other liquid as well as entrained solids will flow laterally through the slots 13 to be discharged from the screen 10 by passage over the apices 16. Thus, FIG. 2 schematically illustrates a slurry 15 flowing downwardly over the working surface 17 of the screen 10 with oversized material 19 continuing downwardly over the working surface and undersized material 21 passing through the slots 13 to drain over the apices 16.

It can be appreciated that the ease with which liquid as well as entrained solids drain from the apices 16 will depend upon such factors as the angle at which the supporting structure 11 supports the screen 10, and the angle between the sides of the triangular rods which form the apices 16. There may also be a tendency, depending upon the surface tension of the liquid being separated from the slurry, for the liquid to bridge across the slots 13 as if to form bubbles. However, the applications in which the present invention will be ordinarily employed contemplate a continuing cascading of slurry downwardly over the operating surface of the screen, with the result that initially separated liquid and undersized solids which tend to remain in the slots 13 will be displaced outwardly by later separated liquid entering into the slots 13. Accordingly, the liquid and undersized solids being separated from the slurry is advanced efficiently toward the apices 16, and, due to the small cross-sectional area of the rod elements 12 at the apices 16, there is little tendency for the liquid to continue to adhere to the rods 12 and, thus, little tendency for such liquid and solids to return toward the triangular bases 14 where it might be reabsorbed into the oversized solids component passing downwardly over the working surface of the screen 10.

While the screen 10 is illustrated and described as formed with conventional triangular profiles, those skilled in the art will appreciate that the advantages of the present invention are not confined to triangular profiles. FIG. 3, accordingly, illustrates cylindrical profiles, i.e., elongated rods or wires 22 of a circular cross-section, supported in generally parallel and spaced apart relationship by means of weld beads 24 extending transversely over the working surface of the resultant screen 20.

The weld beads may be of a type that are extruded in a molten state on to the rod elements 22 and which cool to a generally rigid condition with the passage of time. The rod elements 22 are preferably, although not necessarily, of a metallic material such as steel; and, as the initially molten weld beads 24 are laid upon the rod elements 22, each of the rods is fixedly attached to each weld bead. It can be appreciated, of course, that FIG. 3 is somewhat schematic in illustrating the weld beads 24 as having uniform surfaces throughout. In practice, the weld beads, since deposited in molten form, will have irregular surface configurations and may, from time to time, settle modestly between the rods 22.

FIG. 4 illustrates one manner in which looped wires can be utilized in the practice of the present invention. The looped wires commonly used in the industrial screen art are produced with initially cylindrical wires, i.e., elongated wires of circular cross section, the wires being first looped at spaced intervals, and thereafter the segments of wire extending between adjacent loops coined to a generally triangular cross section. In the ordinary coining operation of the prior art, primary attention is paid to the formation of the triangular apices, these being the apices pointing in the downward direction in FIG. 4. For purposes of the present invention, however, primary emphasis is placed upon the coining of the bases opposite such apices, i.e., the bases appearing on the topside of the screen as illustrated in FIG. 4, so as to assure production of generally smooth working surfaces bound by sharp angular edges extending along the lengths of segments extending between loops.

FIG. 4 illustrates appropriately coined rods 32 having appropriately formed bases 34 and forming a screen 30, the wires 32 being looped to form loops 36 which surround cross-rods 42, only one of which appears in the drawings. In the coining process, the loops 36 are typically subjected to a modest die pressure which may flatten the sides of the loops as shown by the flattened portions 40 illustrated in FIG. 4. The flattening of the loops 36 establishes a minimum separation between the coined wire segments 38. This separation may sometimes be increased by the interposition of washers, not shown, between adjacent loops. After the wires have been both looped and coined, the coined segments extending between the loops have a generally triangular cross-section, the section 39 illustrated in FIG. 4 being representative.

In the use of the screen 30 of FIG. 4, the screen is inclined, as generally suggested by FIG. 1, so that a slurry to be processed on the screen 30 will cascade downwardly over the bases 34 of the coined segments 38, the slurry skipping from base to base and thus cascading downwardly with the liquid and undersized solids being progressively shaved from the slurry as the slurry crosses the uppermost side edges of the segments 38. The liquid and undersized material thereby extracted from the slurry progresses away from the slurry through the slots 44 residing between adjacent segments 38 in the fashion already described in reference to FIG. 2.

FIG. 5 illustrates in a schematic fashion the screen 10 as formed with linearly straight supporting bars, or beads, and FIG. 6 illustrates a screen 10a formed to a curved configuration by bending initially straight supporting bars, such as the bars 18 shown in FIG. 2, with use of common roll bending. The selection of planar or curved screens is deemed to be a matter of choice within the purview of one skilled in the art.

It can be appreciated, of course, that upstanding bars such as the bars 18 of FIG. 2 function effectively to divide the slurry flowing downwardly over the screen into portions flowing along streamlines between the bars 18. In the same fashion the loops 36 encircling the screen rods 42 of FIG. 4 cooperate to direct the slurry flowing over the screen 30 along streamlines extending between the loops. Similarly with a welded bead construction such as illustrated in FIG. 3 there will be a tendency for the weld beads to direct the slurry flowing over the screen 20 along streamlines extending between the beads. As a consequence, there is a benefit in each of the screen assemblies disclosed in the present application in that the downward flow of slurry is guided in such a fashion that the slurry will not tend to wander to one side of the screen and thus overload that side of the screen.

While the present disclosure illustrates profile rods, such as the triangular rods 12 illustrated in FIG. 2, which are all of uniform sizes and shapes spaced apart along the length of a screen, it is to be appreciated that the invention is not limited to such uniform profile arrangements. In particular it is considered within the purview of this invention to intermix profiles of various sizes and shapes, such as triangular and circular, and thus construct screens which may not have uniform profiles distributed along the length of the screens. Also while the present invention has been described in reference to so-called static sieves, it is to be appreciated that vibrators may be attached to the screens so as to shake from the slots of the screens solids that may otherwise be trapped between the screen profile bars. Small air powered or electric contact vibrators may thus be attached to either side of the screen and their operation may be intermittent or continuous as conditions require. For the same reasons, hammers may be manually or mechanically actuated to strike the screen as may be required.

While metallic screens of welded construction have been above discussed it will be appreciated by those skilled in the art that other screen materials such as ceramic materials may be utilized for various types of sieve operations and in such case screens formed of ceramic profile rods bonded to suitable supporting structures may be employed.

Although the preferred embodiments of the present invention have been described, it will be understood that various changes may be made within the scope of the appended claims.

Having thus described my invention, I claim:

1. In a static screen device of the type comprising a screen having a working surface for use in separating the undersized component from the oversized component of a slurry flowing over said working surface, said screen comprising a plurality of rod elements, and support means retaining said rod elements in spaced apart and generally parallel relation to define said working surface and to define slots between said rod elements through which said undersized component passes to escape through the opposite surface of said screen, the improvement wherein the entire said support means is disposed remotely from said opposite surface of said screen sufficiently to minimize the liquid buildup at said opposite surface and thereby promote the efficient passage of the undersized component through said screen; and stationary mounting means is provided for mounting said screen in a fixed position and inclined from end to end whereupon the slurry will flow downwardly over said working surface, with each of said rod elements located generally horizontal and transverse to the direction of slurry flow.

2. The improvement of claim 1 wherein said supporting means comprises members extending generally perpendicular to the axes of said rod elements.

3. The improvement of claim 2 wherein said members stand upwardly from said working surface.

4. The improvement of claim 2 wherein said members comprise cross-rods extending generally perpendicular to said rod elements, said rod elements looped outwardly from said working surface about said cross-rods to reenter said working surface.

5. The improvement of claim 1 wherein said rod elements are generally triangular in cross section and said working surface comprises bases of said triangularly shaped rod elements disposed in generally coplanar relationship.

6. The improvement of claim 1 wherein said support means is disposed to tend to guide the slurry in the direction of slurry flow and thereby to resist wandering of the slurry to a side of said screen.

7. In a static sieve for generally separating the undersized and oversized components of a slurry, said static sieve comprising a screen comprising a plurality of rods and support means retaining said rods in spaced apart and generally horizontal relation, said rods cooperatively defining an upper working surface of said screen and an undersurface through which said undersized component drains by passing through the spaces between said rods, the improvement wherein the entire said support means is disposed at said working surface of said screen and is disposed remotely from said undersurface of said screen sufficiently to minimize the liquid buildup at said undersurface and thereby promote the efficient passage of the undersized component through said screen, and stationary means is provided for mounting said screen in a fixed, inclined position so that the slurry will flow downwardly over said working surface, said stationary means mounting said screen with said rods disposed transversely to the slurry flow.

8. The improvement of claim 7 wherein said support means comprises bead means extending transversely of said rods along said working surface.

9. Improvement of claim 7 wherein said rods have generally triangular cross sections, said working surface comprising bases of said rods and each rod having a triangular apex projecting to said undersurface.

10. The improvement of claim 7 wherein said support means is disposed to tend to guide the slurry in the direction of slurry flow and thereby to resist wandering of the slurry to a side of said screen.

11. In the method of separating the undersized and oversized components of a slurry by passing the slurry over the upper working surface of a sloped static screen, the steps of providing a screen formed by rod elements and by spacing means for spacing said rod elements apart at said working surface thereof, said spacing means being disposed sufficiently remote from the surface of said screen opposite said working surface to minimize the liquid buildup at said opposite surface and thereby promote the efficient passage of the undersized component through said screen, and said spacing means projecting upwardly from said working surface for dividing said slurry into stream lines and being aligned to cooperate to direct said stream lines of slurry linearly down said screen; providing a mounting for said screen in a fixed, sloped position with said working surface facing generally upwardly and with said rod elements generally transverse to the slurry flow; and flowing the slurry over said working surface.

12. The method of claim 11 wherein said rod elements are of generally triangular cross section, and including the step of engaging said spacing means to bases of said rod elements located at said working surface so that the apices of said rod elements opposite said bases provide slots which diverge in progressing away from said bases.

13. In the separation of undersized from oversized components of a slurry flowing over a static screen, the method of reducing a tendency of an undersized component to cling to the underside of the screen comprising the steps of: providing a screen comprising rod elements spaced apart by spacing means; providing a mounting for said screen in a fixed, inclined position with each of said rod elements extending generally horizontal and transverse to the direction of slurry flow and with the entire said spacing means remote from the underside of said screen sufficiently to minimize the liquid buildup at said underside surface and thereby promote the efficient passage of the undersized component through said screen; and flowing the slurry over said working surface.

* * * * *

UNITED STATES PATENT AND TRADEMARK OFFICE
CERTIFICATE OF CORRECTION

PATENT NO. : 4,250,038
DATED : February 10, 1981
INVENTOR(S) : Joseph L. Dryden

It is certified that error appears in the above-identified patent and that said Letters Patent are hereby corrected as shown below:

Column 4, lines 8 and 9, delete "in a molten state"

Claim 2, lines 1 and 2, "supporting" should read ---support---

Signed and Sealed this

Sixteenth Day of June 1981

[SEAL]

Attest:

RENE D. TEGTMEYER

*Attesting Officer*   *Acting Commissioner of Patents and Trademarks*